(12) United States Patent
Kim

(10) Patent No.: US 8,318,336 B2
(45) Date of Patent: Nov. 27, 2012

(54) RECHARGEABLE BATTERY

(75) Inventor: Yong-Sam Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1103 days.

(21) Appl. No.: 11/495,325

(22) Filed: Jul. 26, 2006

(65) Prior Publication Data
US 2007/0026307 A1 Feb. 1, 2007

(30) Foreign Application Priority Data

Jul. 29, 2005 (KR) .................. 10-2005-0069441

(51) Int. Cl.
*H01M 2/26* (2006.01)
*H01M 2/06* (2006.01)

(52) U.S. Cl. .......... 429/161; 429/66; 429/123; 429/170; 429/180; 429/94

(58) Field of Classification Search .................. 429/122, 429/66, 95, 123, 161, 170, 180; 439/754–774
See application file for complete search history.

(56) References Cited

U.S. PATENT DOCUMENTS

| | | | |
|---|---|---|---|
| 5,849,431 A * | 12/1998 | Kita et al. ...................... | 429/164 |
| 6,027,831 A * | 2/2000 | Inoue et al. ..................... | 429/181 |
| 6,440,604 B1 * | 8/2002 | Inoue et al. ..................... | 429/211 |
| 6,712,528 B2 * | 3/2004 | Galeotti et al. ................. | 385/91 |
| 7,541,112 B2 * | 6/2009 | Richard et al. ................. | 429/211 |
| 7,790,313 B2 * | 9/2010 | Lee ................................. | 429/208 |
| 2002/0012837 A1 * | 1/2002 | Hensley et al. ................. | 429/174 |
| 2003/0035993 A1 * | 2/2003 | Enomoto et al. ................ | 429/66 |
| 2003/0129479 A1 * | 7/2003 | Munenaga et al. ............. | 429/94 |
| 2003/0190530 A1 * | 10/2003 | Yang et al. ...................... | 429/326 |
| 2005/0008933 A1 * | 1/2005 | Ligeois et al. ................. | 429/161 |
| 2005/0061433 A1 * | 3/2005 | Murayama ................. | 156/304.3 |
| 2005/0106461 A1 * | 5/2005 | Moore et al. ................... | 429/229 |
| 2005/0130035 A1 * | 6/2005 | Inada et al. ..................... | 429/161 |
| 2006/0051664 A1 * | 3/2006 | Tasai et al. ..................... | 429/161 |

(Continued)

FOREIGN PATENT DOCUMENTS

CN 2859825 Y 1/2007

(Continued)

OTHER PUBLICATIONS

Patent Abstracts of Japan, Publication No. 05-325939; Date of Publication: Dec. 10, 1993; in the name of Toshibumi Yoshimine.

(Continued)

*Primary Examiner* — Ula C Ruddock
*Assistant Examiner* — Amanda Barrow
(74) *Attorney, Agent, or Firm* — Christie, Parker & Hale, LLP

(57) ABSTRACT

A rechargeable battery includes an electrode assembly having positive and negative electrodes and a separator interposed between the positive and negative electrodes. Each of the positive and negative electrodes has an active material coated part and an active material uncoated part. A case receives the electrode assembly, the case being provided with an opening through which the electrode assembly is inserted therein. A cap plate is coupled to the opening. An electrode terminal is coupled to a through-hole formed on the cap plate and protrudes out of the case. A current collector has a flange part with a cross-sectional area greater than the through-hole and a contacting part which connects the current collector to the active material uncoated part.

12 Claims, 5 Drawing Sheets

U.S. PATENT DOCUMENTS

| | | | |
|---|---|---|---|
| 2006/0263683 A1* | 11/2006 | Yoon et al. | 429/178 |
| 2007/0009793 A1* | 1/2007 | Kim et al. | 429/175 |
| 2007/0117020 A1* | 5/2007 | Baker et al. | 429/234 |

FOREIGN PATENT DOCUMENTS

| | | | |
|---|---|---|---|
| JP | 5-325939 | | 12/1993 |
| JP | 09-161761 | * | 6/1997 |
| JP | 11-195561 | | 7/1999 |
| JP | 2000-228182 | | 8/2000 |
| JP | 2001-015167 | | 1/2001 |
| JP | 2001-038475 | | 2/2001 |
| JP | 2002-100340 | * | 4/2002 |
| JP | 2002-100342 | | 4/2002 |
| JP | 2002-252036 | | 9/2002 |
| KR | 1998-064685 | | 10/1998 |
| WO | WO 96/06464 | | 2/1996 |

OTHER PUBLICATIONS

Patent Abstracts of Japan, Publication No. 2000-228182; Date of Publication: Aug. 15, 2000; in the name of Goro Watanabe et al.

Patent Abstracts of Japan, Publication No. 2002-252036; Date of Publication: Sep. 6, 2002; in the name of Yusuke Watarai et al.

Japanese Office action dated Jan. 19, 2010, for corresponding Japanese application 2006-190513, noting listed references in this IDS.

* cited by examiner

RECHARGEABLE BATTERY

CROSS-REFERENCE TO RELATED APPLICATION

This application claims priority to and the benefit of Korean Patent Application No. 10-2005-0069441 filed in the Korean Intellectual Property Office on Jul. 29, 2005, the entire content of which is incorporated herein by reference.

BACKGROUND OF THE INVENTION

1. Field of the Invention

The present invention relates to a rechargeable battery, and, more particularly to a rechargeable battery having improved current collectors between electrodes and electrode terminals.

2. Description of the Related Art

A conventional rechargeable battery typically includes an electrode assembly having positive electrode and negative electrodes with a separator interposed therebetween, a cap assembly assembled with the case to seal the case, and electrode terminals installed on the cap assembly and electrically connected to the electrode assembly. The electrode assembly is inserted through an opened top of the case, after which the cap assembly is installed on the opened top to seal the case.

The cap assembly is provided with a vent plate to exhaust internal gas out of the case when internal pressure of the case increases above a predetermined level. The cap assembly is also provided with a through-hole in which the electrode terminal is installed with a gasket interposed between the electrode terminal and the through-hole. A flange member is installed on an end portion of the electrode terminal to support the electrode terminal at the through-hole. In addition, in order to provide a current to an external side, the electrode terminal is connected to a current collector attached on the electrode assembly. Typically, the current collector is formed of a thin plate and assembled with the flange part with a lead member interposed therebetween.

The assembly of the above-described conventional discharge battery becomes complicated resulting in an increase in manufacturing time and cost. Further, a contact resistance is generated at a portion where the electrode terminal is connected to the flange or a portion where the flange is connected to the current collector.

SUMMARY OF THE INVENTION

In accordance with the present invention a rechargeable battery is provided having a contacting part contacting an active material uncoated part and a flange part integrally formed with the contacting part.

Also, the present invention provides a rechargeable battery having a current collector that can be easily manufactured through a forging process such that it has a contacting portion contacting an active material uncoated part and a flange part.

According to an exemplary embodiment of the present invention, there is provided a rechargeable battery including: an electrode assembly having positive electrode, negative electrode, and a separator interposed therebetween. Each of the positive and negative electrodes has an active material coated part and an active material uncoated part. A case receives the electrode assembly, the case being provided with an opening through which the electrode assembly is inserted therein. A cap plate is coupled to the opening. An electrode terminal is coupled to a through-hole formed on the cap plate and protrudes out of the case, the electrode terminal having an axis. A current collector has a flange part with a cross-sectional area perpendicular to the axis, the cross-section area being greater than the through-hole. The current collector also has a contacting part at an opposite end to an end with the flange part, the contacting part being connected to the active material uncoated part.

In an exemplary embodiment a rechargeable battery is provided having an electrode assembly having a positive electrode, a negative electrode, and a separator interposed between the positive electrode and the negative electrode, each of the positive electrode and negative electrode having an active material coated part and an active material uncoated part. A case houses the electrode assembly, the case having an opening at opposing ends through which the electrode assembly is insertable. A respective cap plate is coupled to the opening, each respective cap plate having a through-hole. A positive electrode terminal and a negative electrode terminal are provided, each electrode terminal having an electrode terminal axis, the positive electrode terminal being mounted in a through-hole at one opposing end and protruding out of the case, the negative electrode terminal being mounted in a through-hole at the other opposing end and protruding out of the case. A pair of current collectors are provided, one current collector connecting the positive electrode terminal to the positive electrode, the other current collector connecting the negative electrode terminal to the negative electrode. Each current collector has a flange part connected to a respective electrode terminal, the flange part having a cross-sectional area perpendicular to the electrode terminal axis and being greater than a cross-sectional area of the through-hole, and a contacting part connecting the flange part to the respective active material uncoated part.

A width of the current collector may increase from the flange part to the contacting part while a thickness thereof may decrease from the flange part to the contacting part.

The opening may be formed at each of opposite ends of the case.

The electrode terminal may integrally protrude from a top surface of the flange part.

The current collector may have a rectangular cross-section.
The current collector may have rounded corners.
The contacting part may be of uniform thickness.
The case may be prismatic.
The current collector may be forged.
The rechargeable battery may be coupleable to a motor and act as a power source for driving the motor.

DETAILED DESCRIPTION

Figure 1:
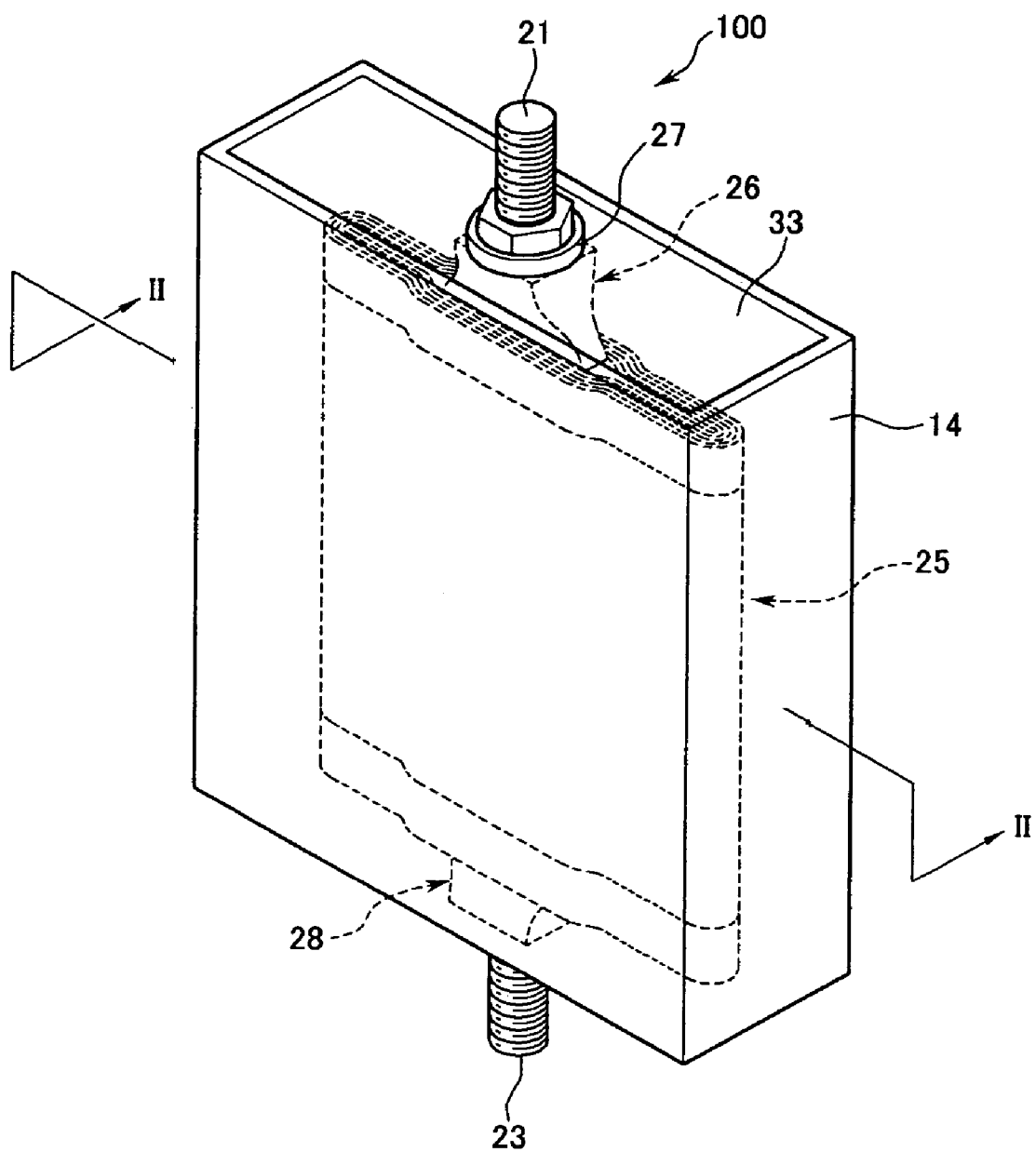
FIG. 1 is a perspective view of a rechargeable battery according to an exemplary embodiment of the present invention
Figure 2:
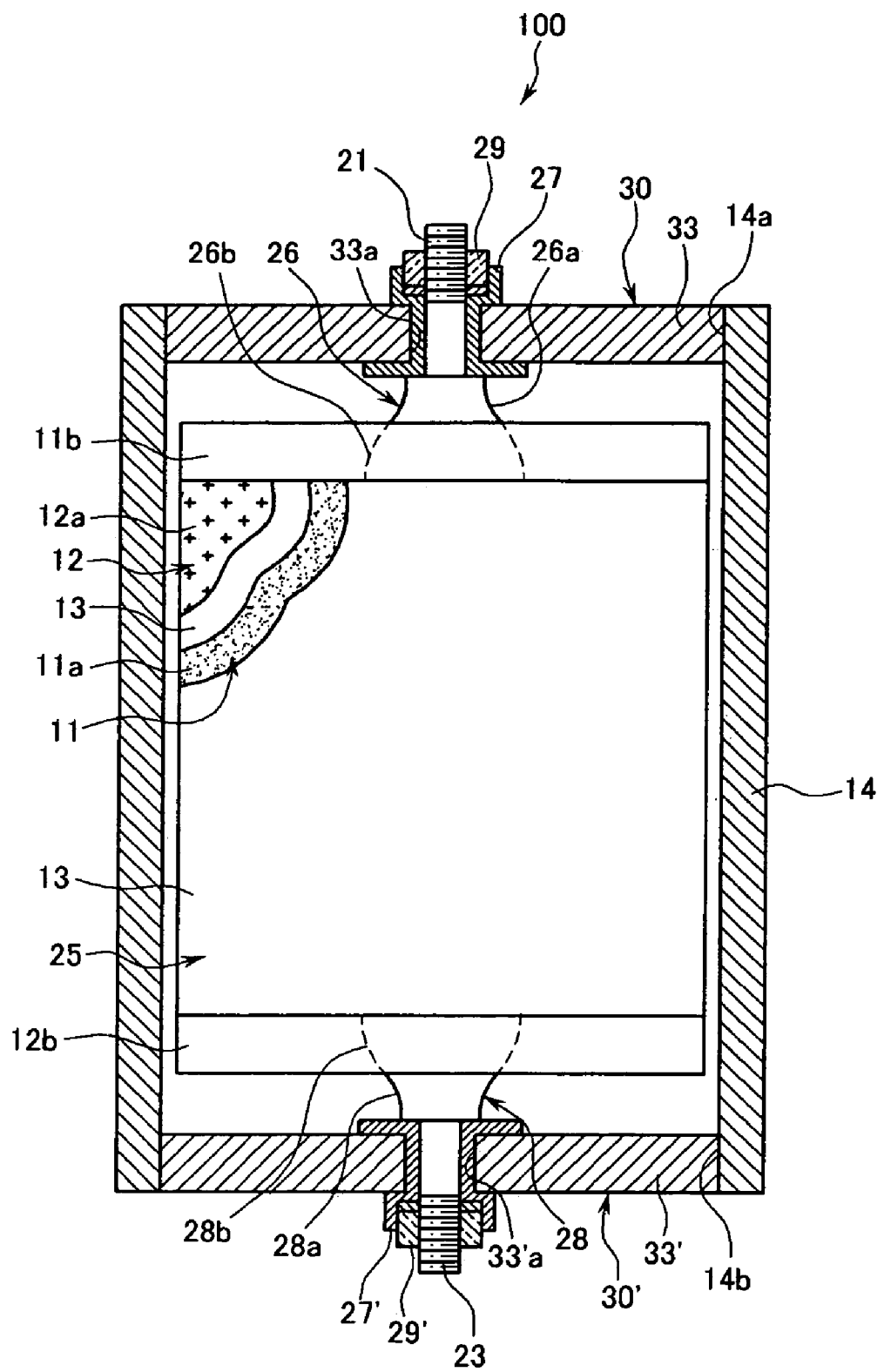
FIG. 2 is a sectional view taken along line II-II of FIG. 1.

Referring to FIGS. 1 and 2, an embodiment of a rechargeable battery 100 includes an electrode assembly 25 having positive and negative electrodes 11, 12 between which a separator 13 is interposed, a case 14 receiving the electrode assembly 25 and provided at opposite ends with openings 14a, 14b, and cap assemblies 30, 30' assembled with the case to seal the respective openings 14a, 14b.

In the present exemplary embodiment the rechargeable battery is a prismatic battery. However, the present invention is not limited to this type battery. For example, the rechargeable battery may be formed in a variety of shapes such as a cylindrical shape.

The positive electrode 11 includes a positive active material coated part 11a formed on a positive current collector formed of a thin metal plate such as an aluminum foil and a positive active material uncoated part 11b formed at an edge of the positive current collector.

The negative electrode 12 includes a negative active material coated part 12a formed on a negative current collector formed of a thin metal plate such as an copper foil and a negative active material uncoated part 12b formed at an edge of the negative current collector.

In this embodiment, the positive and negative active material uncoated parts 11b, 12b are respectively side ends of the positive and negative electrodes 11, 12 in longitudinal directions of the positive and negative electrodes 11, 12.

The positive and negative electrodes 11, 12 are stacked upon one another with a separator 13 interposed therebetween and rolled up to form the jelly-roll type electrode assembly 25. The jelly-roll type electrode assembly 25 may be flattened by being pressed by a press so that it can be received in the case 14 formed in a prismatic shape. The positive and negative active material uncoated parts 11b, 12b are located on opposite side ends of the electrode assembly 25.

The electrode assembly 25 is inserted through the openings 14a, 14b formed on the opposite ends of the case 14. The electrode assembly 25 is placed in the case 14 such that the positive and negative active material uncoated parts 11b, 12b are close to the respective openings 14a, 14b. The cap assemblies 30, 30' are assembled with the case 14 to seal the respective openings 14a, 14b.

The cap assembly 30, 30' includes a cap plate 33, 33' provided with a through-hole 33a, 33a', a current collector 26, 28 electrically connected to the electrode assembly 25, and an electrode terminal 21, 23 connected to the current collector 26, 28. The electrode terminal 21 is a positive terminal connected to the positive active material uncoated part 11b while the electrode terminal 23 is a negative terminal connected to the negative active material uncoated part 12b. In the following description, the electrode terminals 21, 23 may be generally referred as an electrode terminal or a positive or negative terminal for convenience.

The positive and negative terminals 21, 23 protrude from a respective external side of the case while being inserted through respective through-holes 33a, 33a' with respective gaskets 27, 27' interposed around the terminals for providing electrical insulation from the cap plate at the through-holes.

Each current collector 26, 28 includes a contacting part 26b, 28b fitted on the active material uncoated part 11b, 12b and a flange part 26a, 28a coupled to the electrode terminal 21, 23 to support the electrode terminal 21, 23. In this embodiment, the flange part 26a, 28a is integrally formed with the contact part 26b, 28b.

The electrode terminal 21, 23 has a threaded outer circumference and is fixed on the cap plate 33, 33' by a nut 29, 29' thread-coupled on the threaded outer circumference.

Figure 3:
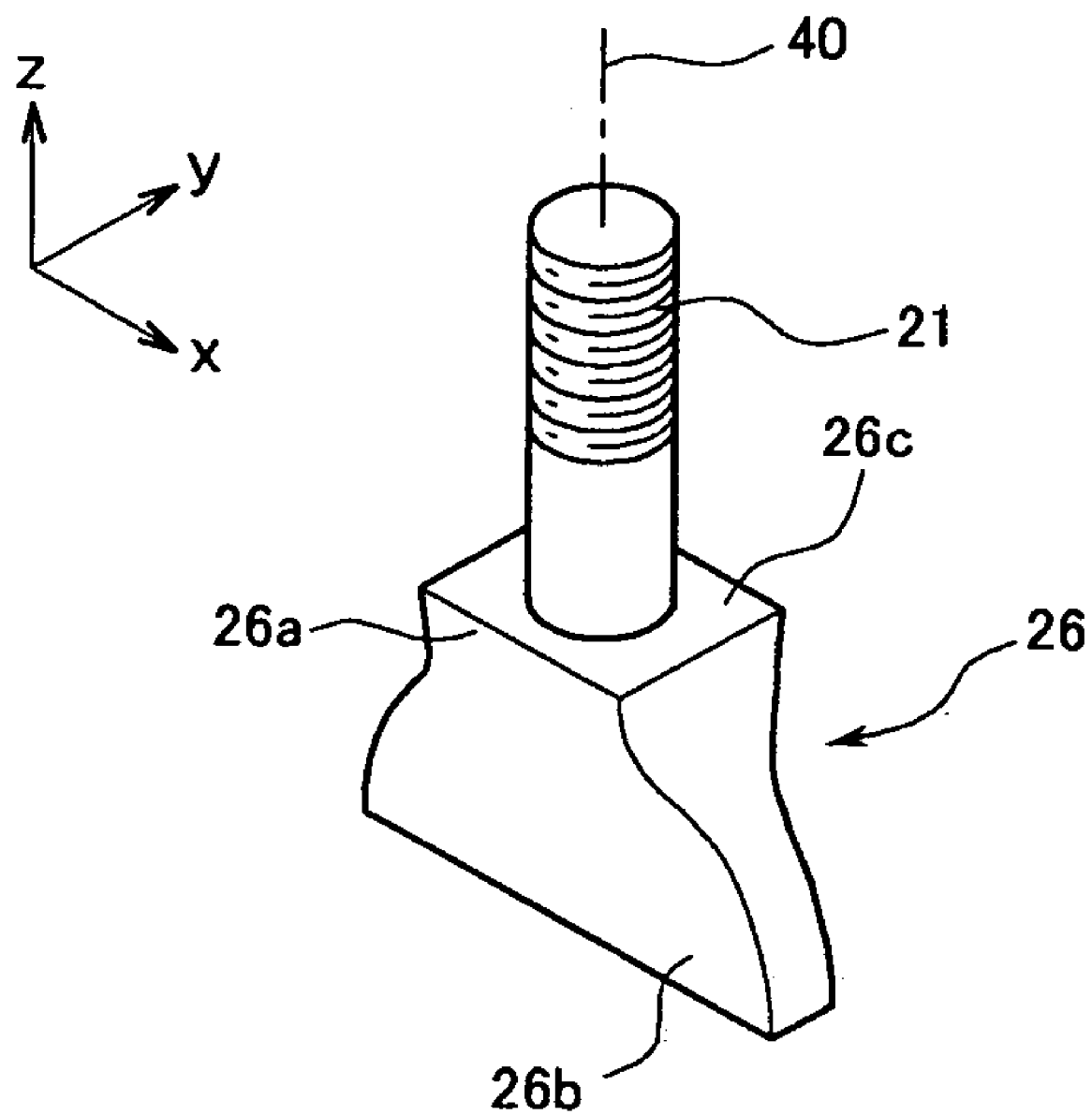
FIG. 3 is a perspective view of an electrode terminal and an current collector of the rechargeable battery of FIG. 1.

FIG. 3 is a perspective view of an electrode terminal and a current collector of the rechargeable battery of FIG. 1. In this embodiment, since the positive terminal 21 and the positive current collector 26 are identical in a structure to the negative terminal 23 and the negative current collector 28, respectively, only the positive terminal 21 and the positive current collector 26 will be described below.

The positive terminal 21 is connected to a flange surface 26c, which defines one end surface of the flange part 26a. The flange surface 26c has an area greater than a cross-sectional area of the through-hole 33a so as to support the positive terminal 21.

The positive terminal 21 and the flange part 26a can be integrally formed with each other or can separately prepared and attached to each other.

In this embodiment, the positive current collector 26 has a rectangular-shaped cross-section perpendicular to the Z-axis of FIG. 3, and, in particular, to an axis 40 of the electrode terminal. A width of the positive current collector 26 gradually increases as it goes from the flange part 26a to a bottom of the contacting part 26b and a thickness thereof gradually decreases as it goes from the flange part 26a to the bottom of the contacting part 26b. The contacting portion 26b has a uniform thickness so that can fit into a space formed on the electrode assembly 25 and is fixed in place by, for example, welding.

Those skilled in the art can appreciate that the above-described structure of the current collector can be easily realized through a forging process.

Therefore, since the flange part 26a has the relatively large cross-sectional area, it can effectively support the positive terminal 21. Since the contacting part 26b is relatively thin, it can easily fit into the positive active material uncoated part 11b of the electrode assembly 25.

Figure 4:
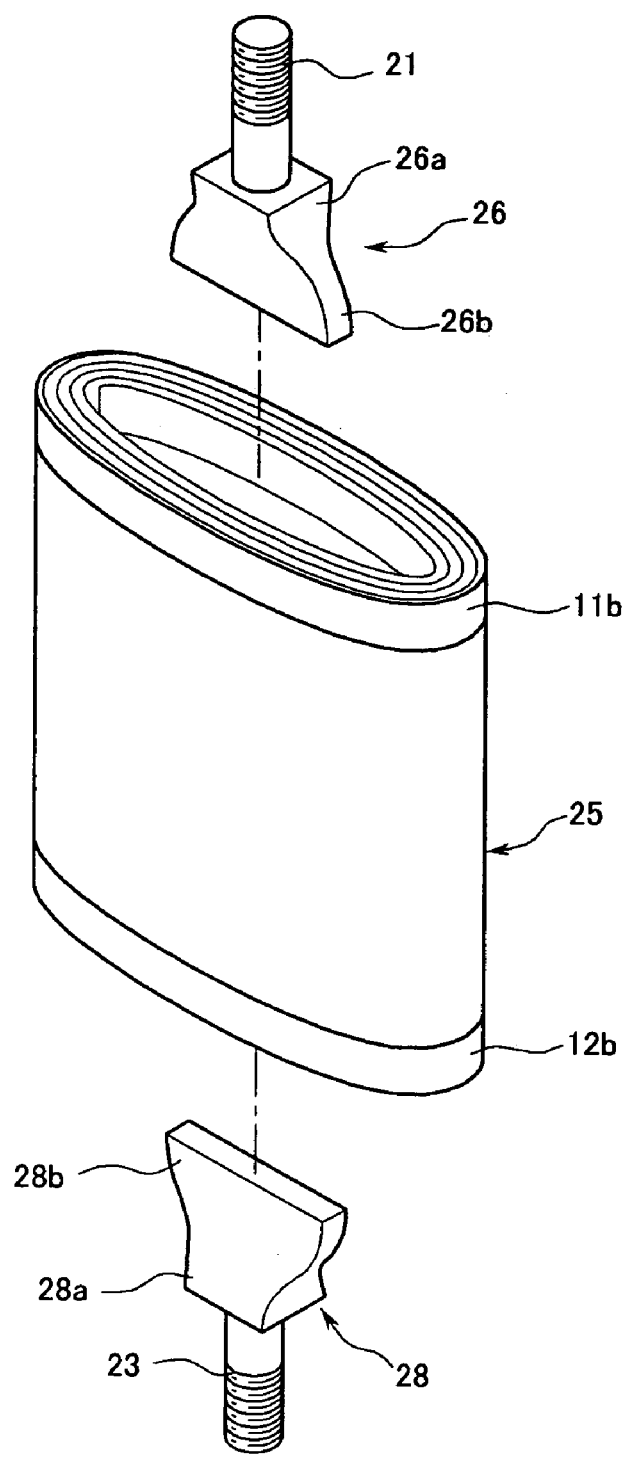
FIG. 4 is an exploded perspective view of an electrode assembly and a current collector of the rechargeable battery of FIG. 1.

As shown in FIG. 4, the positive current collector 26 fits into the positive active material uncoated part 11b while the negative current collector 28 fits into the negative active material uncoated part 12b. Therefore, the positive and negative collectors 26, 28 face each other within electrode assembly 25.

The contacting parts 26b, 28b are respectively fixed on central portions of the positive and negative active material uncoated parts 11b, 12b by, for example, ultrasonic-welding.

Figure 5:
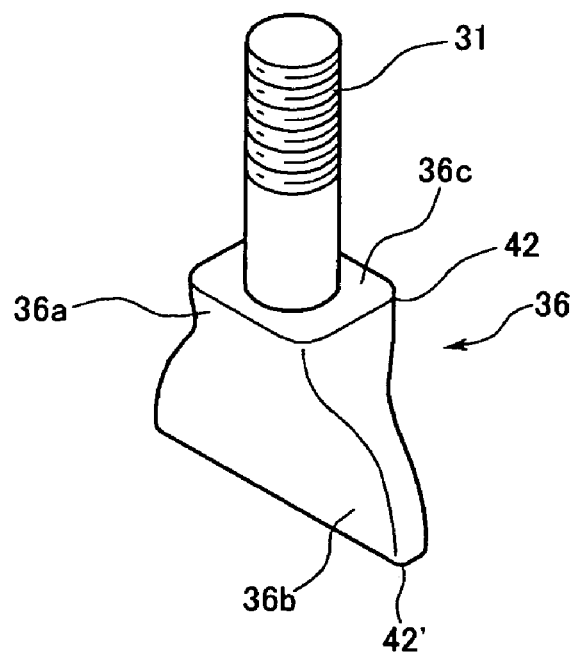
FIG. 5 is a perspective view of a current collector and an electrode terminal of a rechargeable battery according to another embodiment of the present invention.

FIG. 5 is a perspective view of a current collector and an electrode terminal of a rechargeable battery according to another embodiment of the present invention. As in the foregoing embodiment, the current collector 36 also includes a flange part 36a and a contacting part 36b. An electrode terminal 31 is connected on a flange surface 26c of the flange part 36a.

In this embodiment, the flange part 36a and the contacting part 36b are identical to those of the foregoing embodiment except that corners 42, 42' thereof are gently rounded.

Since the corners of the current collector 36 are gently rounded, when the contacting part 36b is inserted in the electrode assembly, damage to the positive and negative electrodes of the electrode assembly by the current collector 36 can be prevented.

Figure 6:
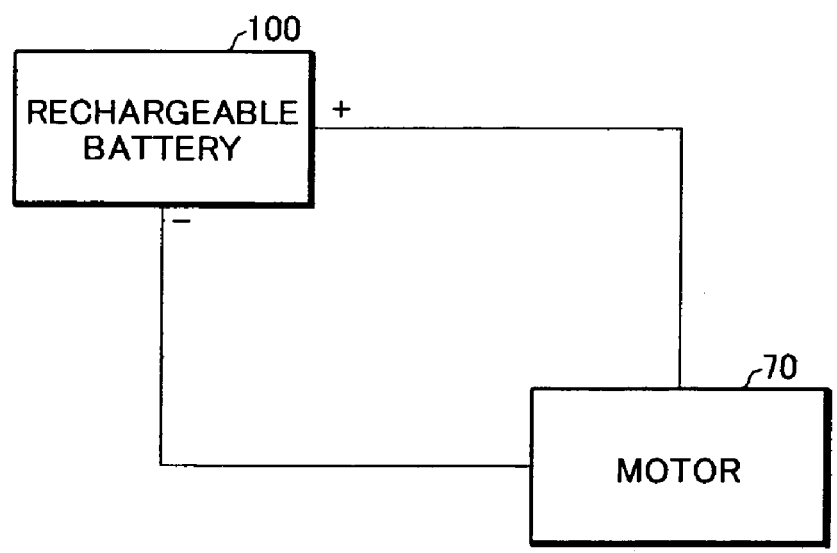
FIG. 6 is a block diagram illustrating an example where a rechargeable battery of the present invention is connected to a motor.

FIG. 6 is a block diagram illustrating an example where the rechargeable battery of the present invention is connected to a motor. As such, the rechargeable battery 100 according to the present invention can form part a module used as the power source for devices such as a motor 70 for use in hybrid electric vehicles, electric vehicles, wireless vacuum cleaners, motorbikes, motor scooters, or the like.

According to the present invention, since the flange part, the contacting part, and the electrode terminal are integrally formed with each other, the manufacturing process can be simplified. In addition, since the current collector is formed in a simple structure, it can be formed through the forging process. Furthermore, the integration of the flange part, contacting part and electrode terminal can reduce the contact resistance.

Although exemplary embodiments of the present invention have been shown and described, it will be appreciated by those skilled in the art that changes may be made without departing from the principles and spirit of the invention, the scope of which is defined in the claims and their equivalents.

What is claimed is:

1. A lithium rechargeable battery comprising:
   an electrode assembly having a positive electrode, a negative electrode, and a separator interposed between the positive electrode and the negative electrode, each of the positive electrode and negative electrode having an active material coated part and an active material uncoated part;
   a case housing the electrode assembly, the case having an opening through which the electrode assembly is insertable;
   a cap plate coupled to the opening;
   an electrode terminal coupled to a through-hole formed on the cap plate, the electrode terminal having an electrode terminal axis and protruding out of the case; and
   a current collector connecting the electrode terminal to the positive electrode or the negative electrode, the current collector comprising:
      a flange part connected to the electrode terminal, the flange part having a cross-sectional area perpendicular to the electrode terminal axis and being greater than a cross-sectional area of the through-hole, and
      a contacting part connecting the flange part to the active material uncoated part, the contacting part having first opposing sides that are larger in area than second opposing sides, wherein each of the first opposing sides makes continuous physical contact from one of its ends to another one of its ends with the active material uncoated part.

2. The rechargeable battery of claim 1, wherein a width of the current collector increases from the flange part to the contacting part, such that a width of the contacting part is greater than a width of the flange part.

3. The rechargeable battery of claim 1, wherein a thickness of the current collector decreases from the flange part to the contacting part.

4. The rechargeable battery claim 1, wherein the opening is formed at each of opposite ends of the case.

5. The rechargeable battery claim 1, wherein the electrode terminal integrally protrudes from an end of the flange part away from the contacting part.

6. The rechargeable battery of claim 1, wherein the flange part has a rectangular cross-sectional area.

7. The rechargeable battery of claim 1, wherein the current collector has rounded corners.

8. The rechargeable battery of claim 1, wherein the contacting part has a uniform thickness.

9. The rechargeable battery of claim 1, wherein the case is prismatic.

10. The rechargeable battery of claim 1, wherein the flange part is integrally formed with the contacting part.

11. The rechargeable battery of claim 1, wherein the current collector is forged.

12. The rechargeable battery of claim 1, wherein the battery is coupleable to a motor as a power source for the motor.

* * * * *